(No Model.)

F. J. FERRELL.
VALVE.

No. 467,796. Patented Jan. 26, 1892.

Witnesses
Geo. W. Breck
Edward Thorpe

Inventor
Frank J. Ferrell
By his Attorney
Henry D. Williams

UNITED STATES PATENT OFFICE.

FRANK J. FERRELL, OF NEW YORK, N. Y., ASSIGNOR TO THE FERRELL MANUFACTURING COMPANY, OF NEW JERSEY.

VALVE.

SPECIFICATION forming part of Letters Patent No. 467,796, dated January 26, 1892.

Application filed December 9, 1890. Serial No. 374,014. (No model.)

*To all whom it may concern:*

Be it known that I, FRANK J. FERRELL, a citizen of the United States, residing at New York city, State of New York, have invented certain new and useful Improvements in Valves, of which the following is a specification, reference being had to the accompanying drawings, forming part hereof.

This invention relates to valves for regulating and controlling fluids, and has for its object to provide an improved indicator for visually indicating the exact amount of opening of the valve. This improved indicator is so constructed that it can be readily applied to any ordinary valve having a rotary stem, and is of compact and simple construction, positive in operation, and gives exact and reliable indications of the exact position of the valve.

Figure 1:
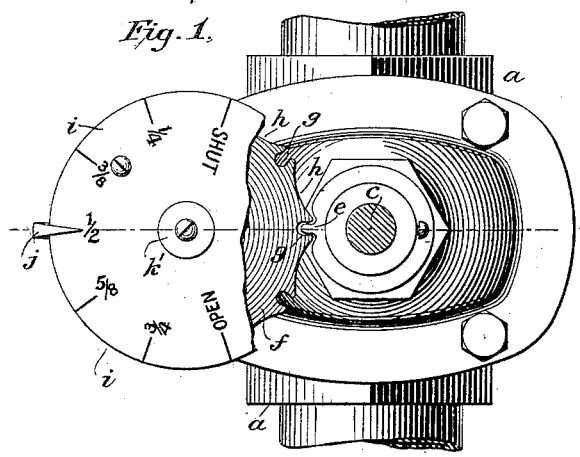
Figure 2:
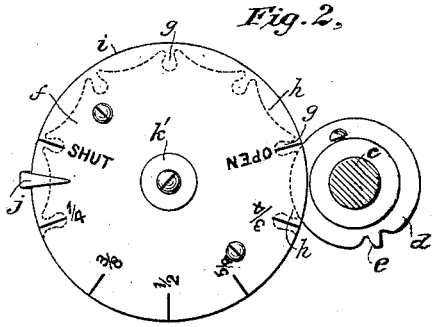
Figure 3:
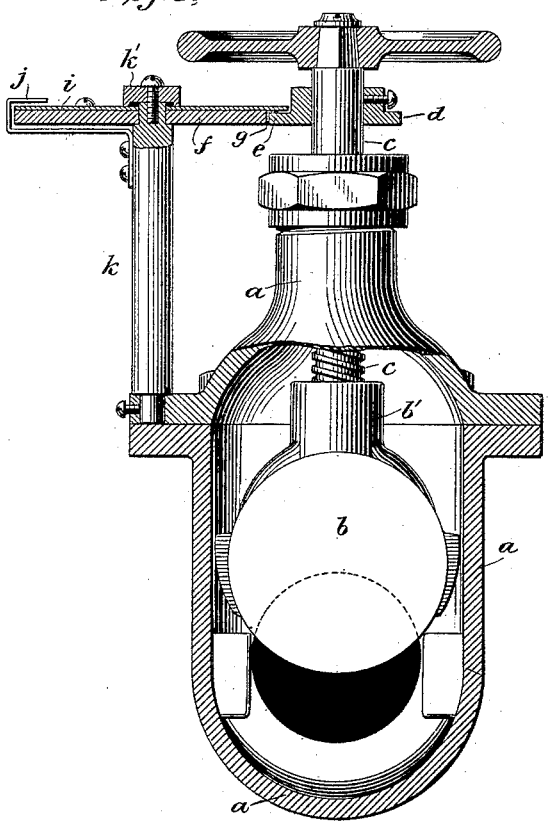
Figure 4:
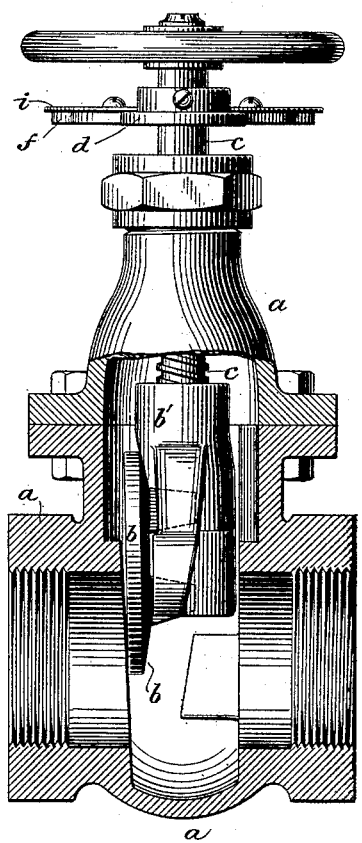

In the accompanying drawings, Figure 1 is an end elevation, partly in central section, of a gate-valve with my improved indicator applied thereto. Fig. 2 is a plan view of the same, partly in section. Fig. 3 is a detached plan of the valve-stem and indicating device. Fig. 4 is a side elevation of the valve and indicating device, partly in central section.

The valve-casing $a$ and the gate-valve $b$ are of ordinary construction. The valve-stem $c$ is also of ordinary construction, its lower end being screw-threaded and working in an internally-threaded sleeve $b'$, which holds the valve. The valve-stem $c$ has a rotary but no longitudinal movement, the necessary longitudinal movement of the valve being imparted to the valve from the lower threaded end of the valve-stem $c$.

The indicating device is operated from the valve-stem $c$, a small wheel or disk $d$, having a tooth $e$, being formed upon or secured to the valve-stem, and another disk $f$ being formed on or attached to a part of the indicating device and provided with grooves $g$, meshing with the tooth on the valve-stem, and with faces $h$ between said grooves engaging with the disk on the valve-stem, so that the disk $f$ will be held thereby from rotation when the tooth $e$ is not in gear with a groove $g$. The disk $d$ is shown circular in general outline, and the engaging-faces $h$ of the disk $f$ are correspondingly concaved. Depressions are formed in the disk $d$ on each side of the tooth $e$, and as the tooth $e$ enters the grooves $g$ the ends of the faces $h$ enter these depressions, thus enabling the disk $f$ to rotate with the toothed disk $e$ and valve-stem $c$. The indicating device comprises the indicating-plate $i$, provided with divisions or marks indicating different positions of the valve and the index $j$. It is essential that either the index or indicating plate shall move in correspondence with the valve-stem. In the best embodiment of my invention, as shown in the drawings, the indicating-plate $i$ is the movable part and is secured to or forms part of the disk $f$, the index $j$ being fixed. The disk $f$ and indicating-plate $i$ are fitted to rotate upon the stud or standard $k$, secured to the valve-casing, and are held in place by the cap $k'$, and the index $j$ is secured to this standard $k$.

When my entire invention is used, the number and position of the grooves $g$ are so adjusted that the tooth $e$ is always in gear with a groove $g$ of the disk $f$ whenever a division on the indicating-plate $i$ is in line with the index $j$, so that at every part of the movement of the valve which is marked by a division on the indicating-plate the indicating device will move with the valve and give an exact and accurate indication of the position of the valve. When the parts are thus constructed, the disk $f$ is locked during that portion of the movement of the valve which is not especially marked upon the indicating-plate $i$, preferably at a point midway between the indicating-marks. Thus although the movement of the indicating-plate is intermittent, as it is locked during part of the stroke of the valve, it nevertheless gives accurate indications. The indicating-plate is in gear with the valve-stem and moves with the valve-stem at all times when a division of the indicating-plate passes under the index.

It is evident that as the disk $f$ is at rest during a considerable part of the movement of the valve it can, although geared directly to the valve-stem, be made of quite small dimensions. In the construction shown, although the disks $f$ and $d$ are about in the proportion of two to one six revolutions of the valve-stem will cause a movement of the disk $f$ of only about seven-twelfths of a revolution. It is evident that my invention is adapted to be applied to any ordinary form of valve having a rotating stem. While it is of simple and cheap construction, it is very compact and affords accurate indications of the position of the valve.

Having thus described my invention, what I claim, and desire to secure by Letters Patent, is—

1. The combination, with a valve and a rotary valve-stem, of the indicating device consisting of the fixed index $j$ and the rotatable indicating-plate $i$, the disk $d$ on the valve-stem and the tooth $e$ on the disk $d$, the disk $f$ on the indicating-plate $i$ and the grooves $g$ and concave faces $h$ on the disk $f$, and a support for the disk and indicating device, the tooth $e$ on disk $d$ and the grooves $g$ on disk $f$ being constructed to mesh and move together when the divisions on the indicating-plate pass under the index, and the concave faces $h$ being constructed to lock the disk $f$ only when the index is between the divisions of the indicating-plate, substantially as set forth.

2. The combination, with a valve and a rotary valve-stem, of the indicating device consisting of the fixed index $j$ and the rotatable indicating-plate $i$, the disk $d$ on the valve-stem and tooth $e$ on the disk $d$, the disk $f$ on the indicating-plate $i$ and the grooves $g$ and concave faces $h$ on the disk $f$, and the standard $k$, supporting the disk $f$ and indicating device, substantially as set forth.

FRANK J. FERRELL.

Witnesses:
HENRY D. WILLIAMS,
LIVINGSTON EMERY.